Figure 1:
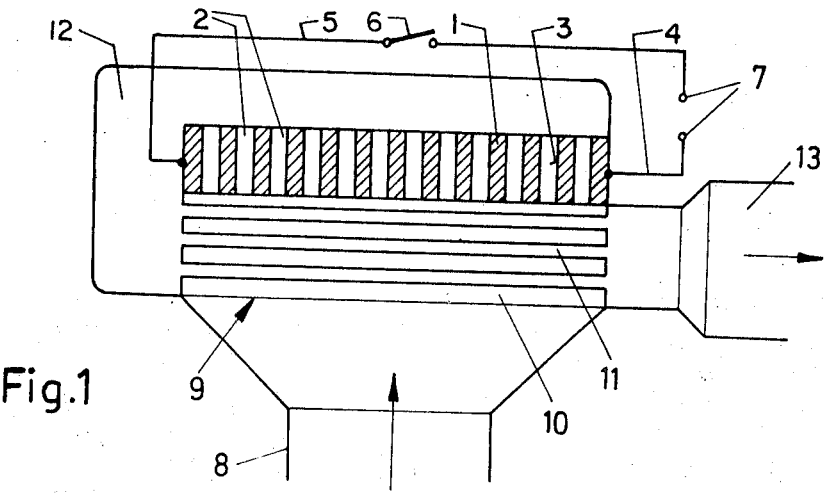

United States Patent
Dyre

[15] 3,654,432
[45] Apr. 4, 1972

[54] ELECTRICALLY HEATED CATALYTIC AIR PURIFIER

[72] Inventor: Mogens Dyre, Als Nordborg, Denmark
[73] Assignee: Danfoss A/S, Nordborg, Denmark
[22] Filed: July 13, 1970
[21] Appl. No.: 54,486

[30] Foreign Application Priority Data
July 3, 1969   Germany ............... P 19 33 828.4

[52] U.S. Cl. ................... 219/374, 23/4, 23/288, 165/66, 165/133, 219/307, 219/375, 252/ 516
[51] Int. Cl. ............... B01j 9/20, F24h 3/04, F28f 13/06
[58] Field of Search ............... 23/2 E, 4, 288; 219/207, 307, 219/374, 375, 376, 381, 553; 252/516; 338/217; 165/66, 133, 166

[56] References Cited

UNITED STATES PATENTS

| | | |
|---|---|---|
| 2,396,190 | 3/1946 | Morgan et al............................23/4 |
| 2,414,135 | 1/1947 | Berlowitz.............................165/66 X |
| 2,691,488 | 10/1954 | Ghai....................................165/66 X |
| 2,850,366 | 9/1958 | Houdry...................................23/288 |
| 3,032,635 | 5/1962 | Kraft....................................219/553 X |
| 3,507,627 | 4/1970 | Fraht et al..........................219/307 X |
| 2,941,962 | 6/1960 | Van Der Beck......................252/516 |

Primary Examiner—R. F. Staubly
Attorney—Wayne B. Easton

[57] ABSTRACT

The invention relates to air-treatment equipment for removing impurities from the air, particularly substances having an odor or taste and bacterial spores. The equipment includes a heating element, maintained at a high temperature, over which the air passes or is directed and this causes air borne particles to break down into odorless substances. The equipment includes a heat exchanger arrangement which serves to reduce the temperature of the heated air returned to the room or space from which the air was withdrawn. The heating element of the heating unit is made of electrically conducting silicon carbide having a thin coating of catalyst material.

1 Claims, 3 Drawing Figures

PATENTED APR 4 1972  3,654,432

ELECTRICALLY HEATED CATALYTIC AIR PURIFIER

The invention relates to air-treatment equipment for removing impurities from the air, particularly substances having an odor and taste, or bacterial spores, in which equipment the air passes over a heating element kept at a high temperature.

There are a number of impurities in air which cannot be held back by a filter. Among these are the above-mentioned substances having an odor or taste, and bacterial spores. It is often required to remove these impurities from the air.

In accordance with an earlier proposal, these impurities can be removed from the air by passing the air over an element held at a high temperature, this resulting in the breakdown of these substances into organic or inorganic substances that are odorless. However, the air is warmed up considerably as the result of the application of heat, and this is often undesirable, for example because the air, after having been cleaned, is passed back to the space from which it was taken, and this space undergoes undesirable heating up. In such cases it has therefore been necessary to pass the treated air over a cooling means or to limit the quantity of air to be circulated to an extent that prevents impermissible heating of the space.

The object of the invention is to provide air-treatment equipment of the initially described kind from which the air emerges at a lower temperature.

According to the invention this object is achieved by means of a heat-exchanger in which the air, warmed by the heating element, gives off heat to the air flowing to the heating element.

This step enables the treated warm air to be cooled by the incoming cool air so that it is at a lower temperature when discharged. Air can therefore be circulated at a greater rate without the danger of the space becoming warmed up too much.

The equipment of the invention is particularly advantageous if the heating element includes electrically conducting silicon carbide and has an operating temperature of at least 450° C. With the help of silicon carbide broad-faced but nevertheless stable heating elements can be produced which have a large area of contact with the air to be treated and therefore eliminate impurities therefrom very effectively while raising the temperature of the air practically to the above-mentioned value.

The temperature of the emerging air can be still further reduced by providing a heatable supporting element with a surface coating of catalyst material and by said element having an operating temperature of 200° to 300° C. This reduction in temperature leads to a corresponding reduction of the temperature of the air emerging from the heat-exchanger.

In this connection it is particularly advantageous if the supporting element can be directly heated by using electrically conducting silicon carbide. This then ensures that temperatures higher than 200° to 300° C. do not occur in the system. Furthermore, because of its good thermal conductivity, a supporting element made of silicon carbide insures that a thin layer of catalyst material becomes uniformly heated all over.

In one embodiment, the heat-exchanger consists of tubes which are disposed in the air passage and which extend substantially parallel with the longitudinal run of a preferably plate-like heating element which closes the air supply passage and contains air-passage orifices extending substantially at right-angles to the tubes. This results in a very compact unit, incorporating the heating element and the heat-exchanger, which unit is particularly suitable for air-extraction means located above a cooking range.

In another very advantageous embodiment, the air-treatment equipment is arranged outside the space, the air in which is to be purified, and the equipment is connected to this space through feed and discharge pipes arranged in heat-exchanging relationship with each other. Such an arrangement is particularly well suited for a refrigerating compartment.

The feed and discharge pipes can consist for example of two concentric pipes forming a heat-exchanger. With this arrangement only one hole needs to be made in the wall of, for example, the refrigerating compartment.

When the system is applied to a refrigerating compartment it is advisable for the feed pipe to be constituted by the inner tube and for the outer tube to be arranged in heat-exchanging relationship with the surrounding air. The returning air is then not only cooled by the incoming air but also by the surrounding air, before it enters the refrigerating compartment again.

Expediently, the air-treatment equipment is accommodated in the base portion of the refrigerator and the feed and supply pipes are passed through the base-plate of the refrigerating compartment. There is generally sufficient room for an air-treatment unit of this kind in the base portion of the refrigerator. Furthermore, the substances that have an odor and a taste collect near the bottom of the refrigerating compartment so that particularly intensive purification is achieved with the method of connection described.

The air-treating equipment can also be accommodated in a cold-air passage running to the condenser. In many refrigerators it is usual for this cold-air passage to run through the base portion. Consequently the treated air, flowing back to the refrigerating compartment, is additionally intensively cooled by the air passing to the evaporator.

If the heating element is arranged concentrically with the feed and discharge pipes, there results a construction in which the angle of the equipment, relatively to the concentric feed and discharge pipes, is immaterial.

Figure 2:
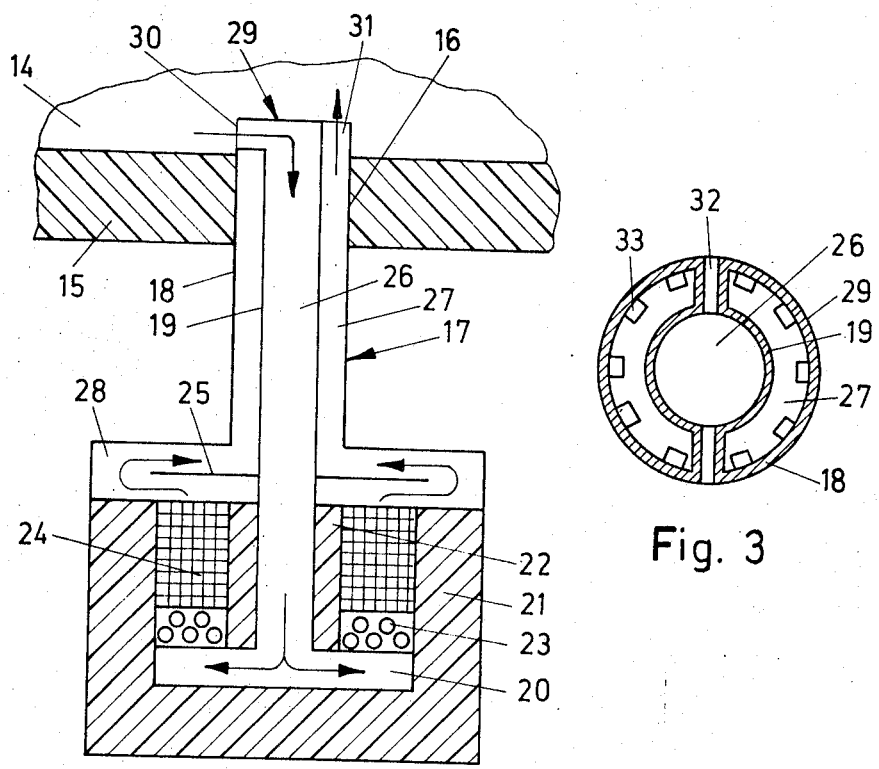
Figure 3:
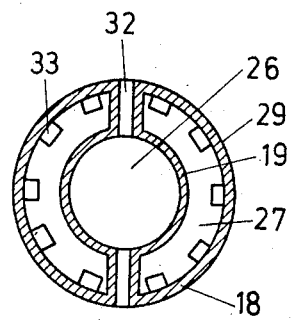

The invention will now be described in more detail by reference to some embodiments illustrated in the drawing, in which:

FIG. 1 is a schematic illustration of equipment of the invention for treating air in the rooms of dwellings, e.g., in kitchens, FIG. 2 shows a partial section through a refrigerator fitted with air-treatment equipment in accordance with the invention, a cover cap being shown schematically, and FIG. 3 is a section showing a view from below of a practical form of cover cap.

The air-treatment equipment shown in FIG. 1 comprises a heating element 1, made of particles of silicon carbide, which are bonded together with the help of silicon oxynitrite. The heating element 1 is in the form of a rectangular plate and contains holes 2 for the passage of air, the inner wall 3 of each of which holes is covered with a thin coating of catalyst material, e.g., platinum. Attached to the two opposite side-faces of the plate are conductors 4 and 5 which lead to mains terminals 7 by way of the switch 6. Accordingly, a heating current can flow through the plate at right-angles to the direction of the passages 2 and can raise the temperature of the plate to approximately 250° C. The air to be treated is first passed, by way of an inlet port 8, to a heat-exchanger 9 which contains a space 10 through which extend tubes 11. These tubes run parallel with the plane of the plate-like heating element 1, which in turn closes the space 10.

The air passes from the space 10 through the passages 2, and the substances that have an odor and taste, and the bacterial spores to be removed are thereby caused to decompose. The treated air passes by way of a return passage 12 to the pipes 11, flows through them and finally, through an outlet port 13, reaches the surrounding atmosphere, e.g., in the room from which it has been drawn.

The outgoing air is cooled very considerably in the heat-exchanger 9 by the incoming air, so that there is no risk of the room becoming unduly hot. A contributory feature is that the heating element 1 needs to be heated to a temperature of only about 250° C. because of the catalyst. Although a blower can be used for circulating the air, relatively little air-circulation is generally sufficient to keep a room free from odor. The chimney draught resulting from the warming up of the air often suffices to provide this small rate of circulation.

In the case of the embodiment seen in FIG. 2, the base-plate 15 of a refrigerator 14 contains an opening 16 into which is inserted a short connecting element 17. This consists of an outer tube 18 and an inner tube 19 arranged concentrically therewith. The inner tube 19 terminates at a distributing chamber 20, which is formed in a cup-shaped insulating casing 21. The tube 19 is surrounded at its lower end by insulating material 22. Between the two insulating means 21 and 22 is an annular heating element 23, which can take the form of an electrical resistor, and above this is located a catalytic composition 24, consisting of a porous ceramic material, e.g., aluminium oxide or porcelain, the surfaces of the pores of which are coated with catalyst material. This catalyst material is heated to a temperature of approximately 250° C. By the air heated by the heating element 23, and said material therefore fulfills its purpose of decomposing the above-mentioned impurities in the air. Positioned above the parts 21, 22 and 24 is a baffle-plate 25.

The inner tube 19 constitutes a feed-passage 26, and the space between the pipes 18 and 19 constitutes a discharge passage 27. The connecting element 17 therefore constitutes a heat-exchanger. Additional cooling of the outcoming air takes place, due to the air of the atmosphere, on the outside wall of the tube 18 as well as on the outside wall of a passage 28 formed by the baffle-plate 25. If the air-inlet passage for the condenser also runs through the base-portion below the base-plate 15 of the refrigerator, very intensive forced cooling takes place.

Inside the refrigerator the connecting element 17 is covered by a cap 29, which prevents the air that comes in through the inlet 30 from meeting the air emerging from the outlet 31. In this connection it is expedient to draw off the incoming air directly at the face of the base-plate, whereas the emerging air is directed upwards.

FIG. 3 illustrates a practical form of a cap of this kind. The feed passage 26 communicates by way of slots 32 with the interior of the refrigerator, these slots beginning at the peripheral wall of the cap 29. The discharge passage 27 on the other hand communicates with the interior of the refrigerator by way of openings 33 in the upper cover face of the cap 29.

The inner pipe 19 can of course constitute the discharge passage, while the outer tube 18 defines the feed passage, if additional cooling by the surrounding air is not required. If it is intended that no warmed air at all should reach the refrigerating compartment, cooling means can also be fitted in the discharge passage.

I claim:

1. Air-treatment apparatus for treating air borne particles comprising a heating unit having air passages and air-inlet and outlet means, a heat-exchange unit having first and second heat exchange passage means, said first heat-exchange passage means being connected to said heating unit air inlet means, said second heat exchange passage means being connected to said heating unit air-outlet means, said heating unit having a surface coating of a catalyst material and an operating temperature between 250° C. and 300° C., said heating unit contains electrically conducting silicon carbide as its major component, and said heat-exchange unit having tubes extending at right angles to said heating unit air passage.

* * * * *